United States Patent [19]

Vulic

[11] 4,274,313
[45] Jun. 23, 1981

[54] APPARATUS FOR CUTTING ASPHERICAL SURFACES ON CONTACT LENSES AND THE LIKE

[76] Inventor: Sekula Vulic, 319 E. 17th Ave., Columbus, Ohio 43201

[21] Appl. No.: 916,601

[22] Filed: Jun. 19, 1978

[51] Int. Cl.³ .............................................. B23B 3/28
[52] U.S. Cl. ..................................................... 82/12
[58] Field of Search ......................................... 82/12

[56] References Cited

U.S. PATENT DOCUMENTS

| | | | |
|---|---|---|---|
| 2,305,055 | 12/1942 | Ashmore et al. | 82/12 |
| 4,051,751 | 10/1977 | Estrada | 82/12 |
| 4,083,272 | 4/1978 | Miller | 82/12 |
| 4,114,486 | 9/1978 | Hooker | 82/12 |

Primary Examiner—Harrison L. Hinson
Attorney, Agent, or Firm—Frank H. Foster

[57] ABSTRACT

A tool carriage for a lathe which permits guiding the tool to cut aspherical lense-shaped surfaces with desired shape factors with only pivotal carriage movement and no carriage translation during the cutting operation. The tool is pivoted about different centers during successive intervals of arc with smooth but instantaneous transitions from one center to another to provide a smoothly contoured aspherical lense-shaped surface. The tool carriage has at least two relatively rotatable, interfitting eccentric ring members (50 and 52) each having an inner and an outer circular bearing which are eccentric to each other. The tool is supported on an inner bearing member (66) which rotatably mates within the innermost one of the eccentric ring members (50 and 52). The outermost eccentric ring member (52) rotatably mates within an outer bearing member (62) which is mounted to a support frame supported by the base of the lathe. A catch means is attached to the inner bearing member and the eccentric ring members to engage at adjustably selected angles of rotation for effecting the rotation of the eccentric ring members simultaneously with the tool.

A polishing tool (410) is disclosed comprising a flexible polishing membrane (418) mounted at its periphery to a support body (416) and a biasing means (424) mounted to the support body (416) for seating against the membrane (418) for supporting it in a selected contour.

13 Claims, 19 Drawing Figures

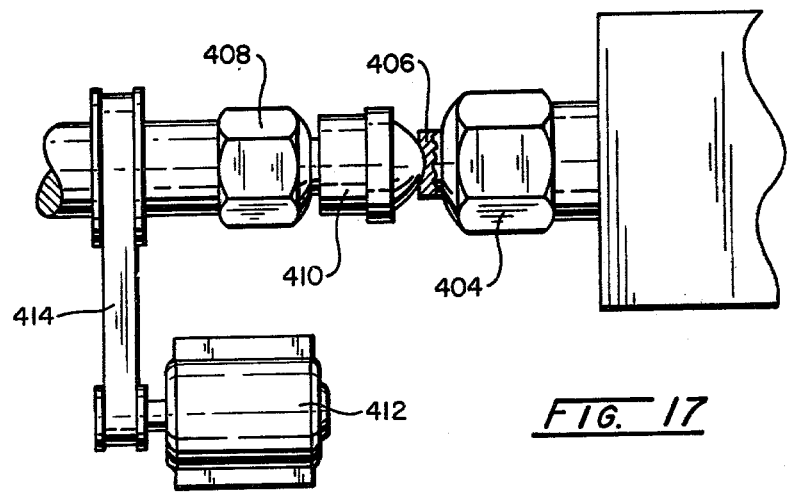
FIG. 17
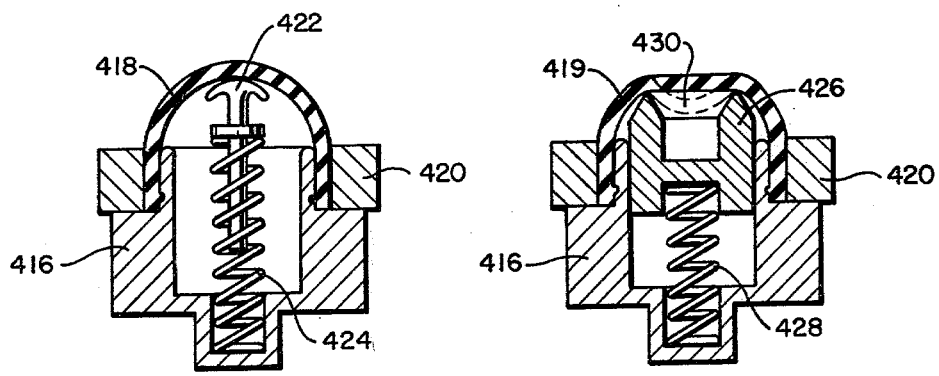
FIG. 18
FIG. 19

APPARATUS FOR CUTTING ASPHERICAL SURFACES ON CONTACT LENSES AND THE LIKE

TECHNICAL FIELD

This invention relates generally to lathes for cutting aspherical surfaces and more particularly relates to a tool carriage for cutting concave and convex lense-shaped surfaces on contact lenses or other workpieces and for polishing such surfaces.

In cutting and shaping opthalmic contact lenses, the surfaces of the lenses must be shaped to provide proper contact with the human eye as well as the desired refractive properties. Since the human eye does not have a spherically shaped surface, a contact lense must be cut with an aspherical surface.

In cutting contact lenses it is conventional that the central portion of the lense surface be spherical within an angular interval and that the periphery of the lense depart from an extension of that spherical surface by a preselected distance. This preselected distance is called the shape factor. The lense must be cut with the proper shape factor and with a smooth and continuous aspherical surface.

Spherical surfaces are conventionally cut on a work piece, such as a refractive body forming a lense blank, by swinging a cutting tool about a center and along a given arc to remove portions of the work piece while the work piece is rotated about its own axis. The workpiece may at times be rotated about an axis which is radially offset but parallel to the axis of the workpiece.

The tool may be a cutting, grinding or other tool for removing portions of the work piece. In this manner the workpiece may be machined to its proper optical shape.

BACKGROUND ART

Prior art workers have devised and suggested a variety of mechanisms for modifying the simple pivotal movement of the tool during the cutting operation in order to form the desired aspherical surfaces. However, these prior art devices involve the use of cams, patterns and other linkages and mechanisms which may result in the translation of a portion of the tool carriage during the cutting operation.

Examples of such prior art devices are shown in the following U.S. Pat. Nos.: 4,051,751; 3,835,588; 3,977,279; 3,835,588; and 913,274.

The difficulty with such prior art devices is that mechanical parts which will move in linear translation relative to each other, such as a sliding or translating table, cannot be machined to the close tolerances to which rotating or pivotal parts can be machined. Such sliding tables are also subject to considerable wear. Therefore, the translation movement is done with parts which interfit in a relatively sloppy manner. The resulting lense surface is not cut sufficiently smoothly and accurately.

Additional lense shaping apparatus is shown in these following U.S. Pat. Nos.: 2,880,556; 3,662,040; 3,117,396; 2,545,447, 3,763,597; 2,633,675, 3,015,196; 3,289,355; 596,503; 3,913,274; 2,806,327; 2,403,668; 2,427,020; 3,468,067; 2,556,604; 2,237,744; and 3,853,499.

If a cam or pattern and a cooperating cam follower are used, they require a spring. The spring will change its applied force as it is used so that the cam follower will be a different distance from the cam after the spring force changes.

BRIEF DISCLOSURE OF THE INVENTION

The invention is a tool carriage having a support frame and at least one eccentric ring member and preferably two relatively rotatable, interfitting eccentric ring members each eccentric ring member having an inner and an outer circular bearing which are eccentric to each other. An outer bearing member is mounted to the support frame and rotatably mates with the outer bearing of the outer most one of the eccentric ring members. An inner bearing member supports the tool and has an outside bearing which rotatably mates with the inner bearing of the inner most one of the eccentric ring members. A cooperating catch means is attached to the inner bearing member and the eccentric ring members for being selectively positioned to engage at a selected angle of rotation for effecting the rotation of at least one of the eccentric ring members simultaneously with the rotation of said inner bearing member and the tool after said engagement.

The invention further comprises an improved polishing apparatus having a flexible polishing membrane mounted at its periphery to a support member and having a biasing means in the support body which seats against the membrane and supports it in a selected contour.

BRIEF DESCRIPTION OF THE DRAWINGS

FIG. 17 is a diagrammatic view illustrating the polishing mechanism constructed in accordance with the present invention.

FIG. 18 is a view in diametric section illustrating a polishing apparatus embodying the present invention for polishing concave lense-shaped surfaces.

FIG. 19 is a view in diametric section illustrating a polishing apparatus embodying the present invention for polishing convex lense-shaped surfaces.

BEST MODE FOR CARRYING OUT THE INVENTION

Figure 1:
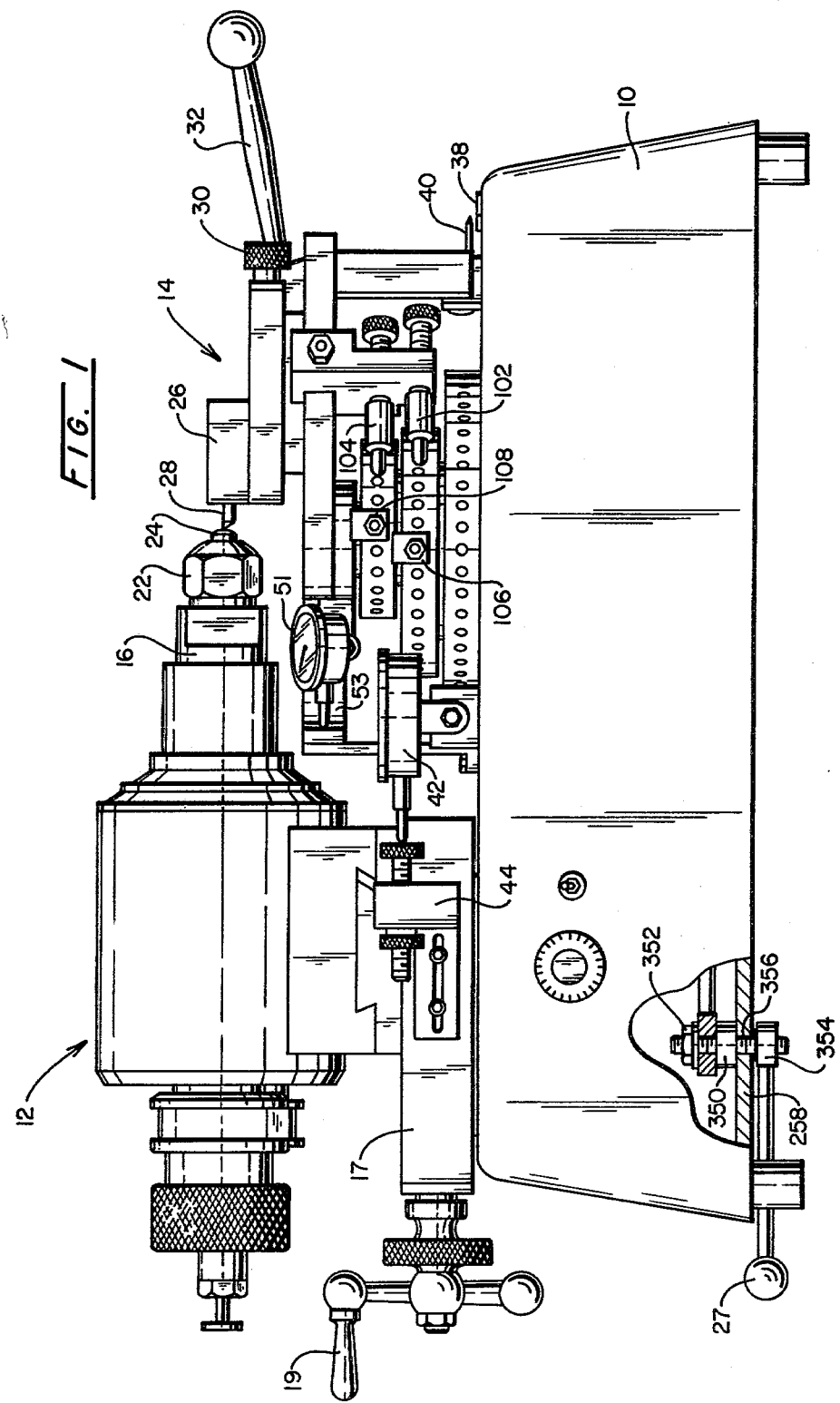
FIG. 1 is a view in side elevation of a lathe embodying the present invention.
Figure 2:
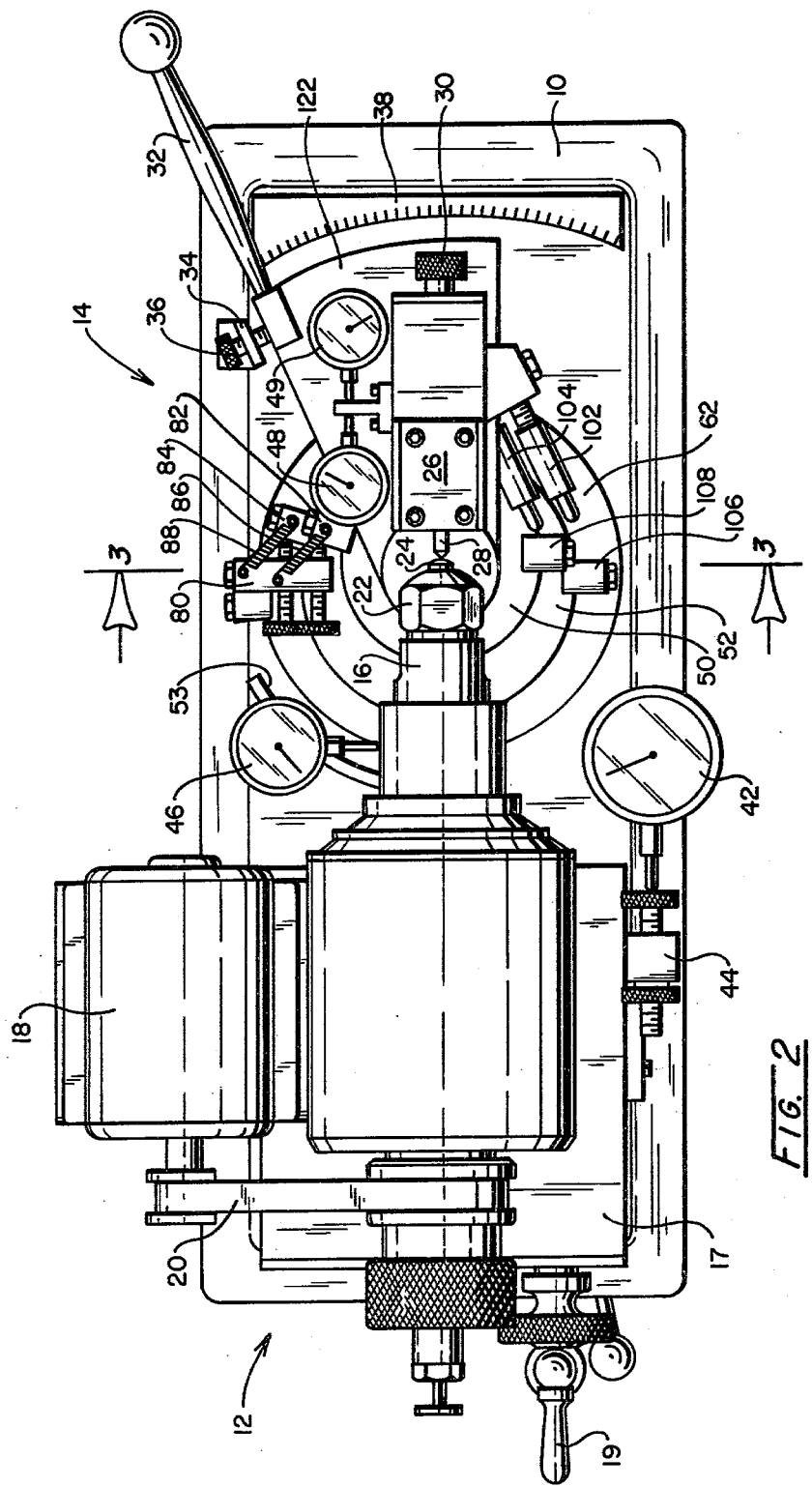
FIG. 2 is a top plan view of the embodiment of the invention illustrated in FIG. 1.

FIGS. 1 and 2 illustrate a lathe embodying the present invention and particularly adapted for forming lense surfaces on a lense blank. The lathe has a support base 10 on which are mounted a head stock 12 and a tool carriage 14. The head stock 12 includes a spindle 16 which is rotatably driven by an electric motor 18 through a drive belt 20.

An electrical switch 21 is mounted to the support base 10 to energize and deenergize the motor 18. The head stock 12 also includes a slideable table 17 on which the spindle is supported and which is conventionally slideably mounted to the support base 10 for longitudinal and lateral adjustment in translation parallel and perpendicular respectively to the axis of rotation of the spindle 16 by means of the crank 19 and a similar crank mechanism not visible.

The spindle 16 has a spindle chuck 22 mounted to it for supporting a workpiece. Conventionally, the workpiece is a lense blank 24 which is held in a chuck collet during shaping of its first surface and is adhesively attached to the chuck 22 during forming of the second surface.

The tool carriage 14 has a tool chuck 26 for supporting a tool, such as a diamond tipped cutting tool 28, or alternatively a grinding or other tool. The tool carriage 14 supports the chuck 26 and its attached tool so that it is pivotable about a pivot axis which is substantially perpendicular to the axis of rotation of the spindle and in the preferred embodiment is essentially a vertical axis. It will later become apparent that there is more than one such vertical axis about which the tool pivots.

The tool chuck 26 is mounted to the other components of the tool carriage so that it is adjustably translatable along the longitudinal axis of the tool by rotating knurled knob 30 in the conventional manner. This permits the longitudinal adjustment of the tool along its axis so that the tool may be positioned a selected radial distance on either side of the vertical pivot axis of the tool. Thus, when the tool is extended beyond the pivot axis so that the cutting diamond tip is between the pivot axis and the workpiece 24, the tool, upon pivoting of a portion of the tool carriage, will cut a concave surface on the lense blank workpiece 24. When the tool is withdrawn so that it is on the side of the pivot axis opposite to the lense blank workpiece 24, the tool will cut a convex surface on the workpiece.

The tool is pivoted about the vertical axis by an operator grasping the arm 32 and rotating a portion of the tool carriage, to be described below, the tool chuck 26 and attached components in a clockwise direction in FIG. 2.

The tool carriage is biased by a spring bias mechanism so that it will return to the position illustrated. Its motion will be stopped by an adjustable stop means 34 which may be adjusted by a screw 36. The angular rate of pivotal movement of this return is controlled by a resisting means.

The control lever 27 is mounted to the underside of the base 10 for controlling the return characteristics of the pivotal movement of the tool 28. A speed control 31 is mounted on the support base 10 for controlling the rate of return of the pivotal movement of the tool. These will be described in more detail below.

An angle scale 38 is attached to the support base 10 with an index pointer 40 attached to the pivoting portion of the tool carriage so that the angle of pivoting of the tool chuck 26 and therefore the tool 28 may be read directly.

A plurality of gauges are conveniently positioned on the lathe for gauging the movement of its various mechanisms. For example, a gauge 42 is mounted to the support base 10 with its feeler arm in contact with an adjustable arm 44 mounted to the head stock 12 for gauging the longitudinal translation of the head stock 12. A gauge 46 is mounted to the base 10 for gauging the lateral position of the spindle 16. Gauges 48 and 50 are mounted to the tool carriage for gauging the longitudinal positioning of the spindle chuck 26. Gauge 51 gauges shape factor as described below.

Figure 5:
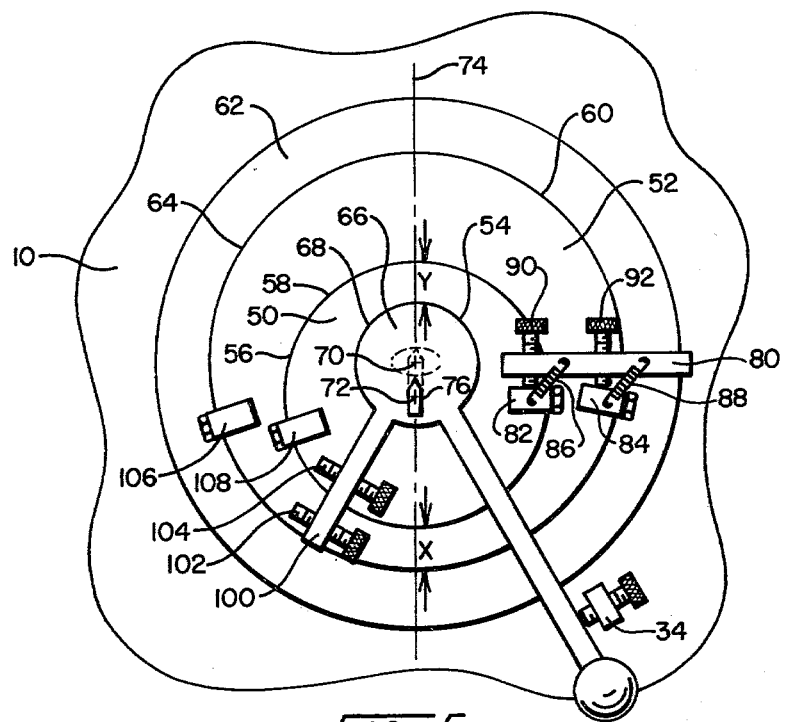
FIG. 5 is a diagrammatic view illustrating the operation and construction of an embodiment of the invention.

The details of the construction of the tool carriage of the embodiment of FIGS. 1 and 2 is aided by a consideration of the diagrammatic drawing in FIG. 5. The tool carriage 14 has two relatively rotatable, interfitting eccentric ring members 50 and 52. Each of these eccentric ring members has an inner and an outer circular bearing which are eccentric to each other. For example, the inner eccentric ring member 50 is provided with an inner bearing 58 and an outer bearing 60. The interfacing bearings 56 and 58 of the inner and outer eccentric ring members 50 and 52 rotatably mate with each other to permit the rotation of one with respect to the other. An outer bearing member 62 is mounted to the support base 10 and has a circular inside bearing 64 which rotatably mates with the outer bearing 60 of the outermost eccentric ring member 52 so that the eccentric ring member 52 may rotate relative to the outer bearing member 62.

An inner bearing member 66 supports the tool chuck. The tool may be radially adjusted relative to the inner bearing member by rotation of the knurled knob 30 but will pivot simultaneously with the inner bearing member 66. The inner bearing member 66 has a circular outside bearing 68 which is concentric with the primary pivot axis 70 for rotatably mating with the inner bearing 54 of the innermost eccentric ring member 50. The inner bearing member 66 may rotate relative to the inner eccentric ring member 50.

As stated above, the inner and outer bearings of each eccentric ring member are eccentric to each other. Their eccentricity is the distance between the centers of their circular bearings. In the preferred embodiment of the invention, this eccentricity will be on the order of one or two millimeters as described below. However, this eccentricity is very greatly exaggerated in the drawings in order to illustrate the structure and operation of the invention.

The primary pivot axis or center 70 is the center for the outer bearing surface 68 of the inner bearing member 66, the inner bearing 54 of the inner eccentric ring member 50, for the outer bearing surface of the outer eccentric ring member 52 and for the inner bearing surface 64 of the outer bearing member 62 where these members are aligned as illustrated.

The center of the bearings which interface between the inner eccentric ring member 50 and the outer eccentric ring member 52 is the secondary center 72 which is displaced along the center line 74 of the tool 76, when the members are aligned as illustrated, preferably by one or two millimeters.

The least radial distance X between the two bearings of the outer eccentric ring member 52 and the least radial distance Y between the two bearings of the inner eccentric ring member 50 are preferably made equal. It may further be observed that the eccentricity between the inner and outer bearings of the inner eccentric ring member 50 and the eccentricity between the inner and outer bearings of the outer eccentric ring member 52 are equal in the embodiment illustrated in FIG. 5.

It is apparent in FIG. 5 that this structure permits the eccentric ring members to be oppositely positioned, that is, positioned so that their dimensions X and Y are diametrically opposite. In this zero reference angular alignment the outside bearing of the outer bearing member 52 and the inside bearing of the inner bearing member 50 are concentric.

The eccentric ring members 50 and 52 are biased toward this zero reference angular alignment by means of an arm 80 which is mounted to the outer bearing member 62 and tabs 82 and 84 mounted respectively to the inner eccentric ring member 50 and the outer eccentric ring member 52 which are connected together by means of tension springs 86 and 88. Adjustable screws 90 and 92 are threadedly engaged through the arm 80 and are radially positioned to stop further counterclockwise movement of the eccentric ring members 50 and 52. The screws 90 and 92, the arm 80 and the tabs 82 and 84 together form a stop means. This stop means prevents the pivotal movement of the ring members in one direction past this zero reference angular alignment. Of course, as described above, the stop 34 provides a similar stop for the inner bearing member 66 which is also biased against that stop by a spring means 300 shown in FIG. 18 and described below.

A catch means is formed by an extension 100 which is attached to the inner bearing member 66 and carries two longitudinally adjustable fingers 102 and 104 for seating against a tab 106 which is fixed to the outer eccentric ring member 52 and a tab 108 attached to the inner eccentric ring member 50 respectively. This catch means may be selectively positioned by circumferential movement of the tabs 106 and 108 as well as longitudinal adjustment of the adjustable fingers 102 and 104 so that the engagement of the fingers 102 and 104 with the tabs 106 and 108 may be at a selected angle of rotation.

Consequently, as the inner bearing member 66 is rotated in a clockwise direction, it alone will rotate until one of the tabs 106 or 108 is engaged by one of the fingers 102 or 104. Once such engagement occurs, further rotation of the inner bearing member 66 will apply a force on the engaged tab so that the associated eccentric ring member will rotate simultaneously with the inner bearing member 66 and therefore with the tool 76 subsequent to said engagement. The tabs 106 and 108 are independently circumferentially positionable about the eccentric ring members 50 and 52 and the fingers 102 and 104 are independently adjustable for fine adjustment so that the angles through which the inner bearing member 66 is rotated to initiate engagement of the catch means is independently selectable and adjustable for each of the eccentric ring members 50 and 52.

Although not essential to an embodiment of the invention, the operation of the invention is substantially improved if the arm 80 of the stop means is also circumferentially adjustable to selected angular positions around the outer bearing member 62. In this manner the zero reference angular alignment of the eccentric ring members 50 and 52 may be adjusted to occur at any selected angle with the axis of rotation of the spindle 60.

Figure 6:
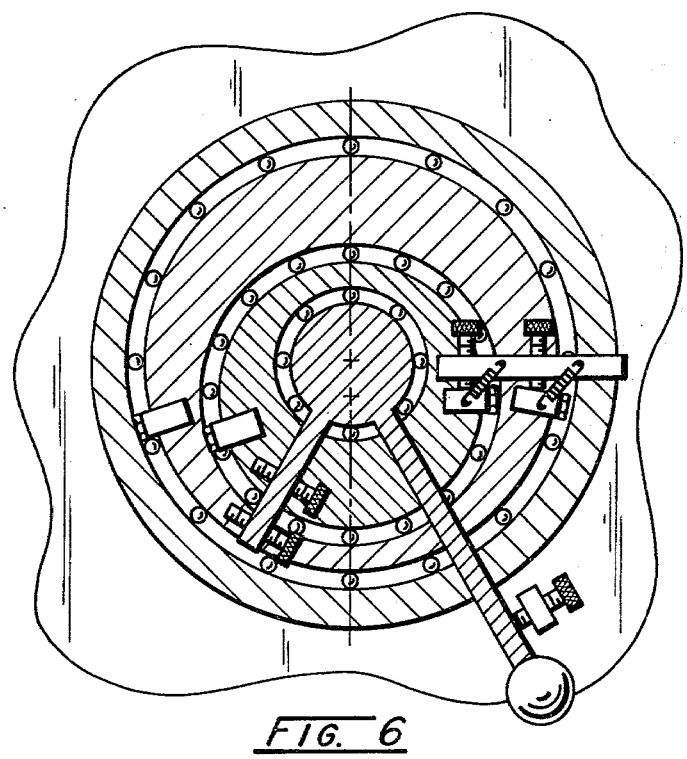
FIG. 6 is a diagrammatic view of the eccentric ring members and associated structure illustrating the operation of the preferred embodiment of the invention.

FIG. 6 diagrammatically illustrates an embodiment substantially equivalent to that illustrated in FIG. 5 but which uses ball type bearings as the bearings between the various eccentric ring members and bearing members described above.

Figure 3:
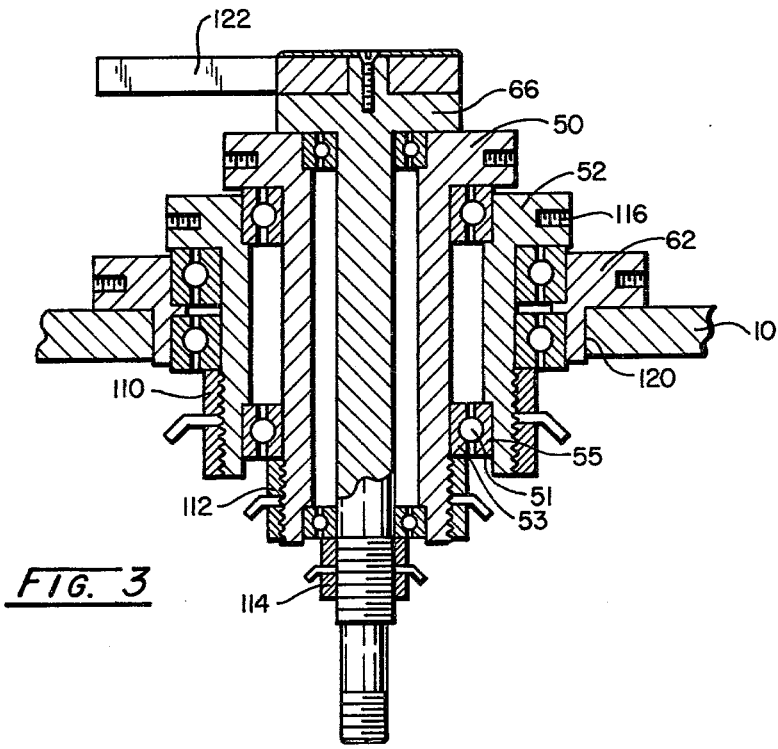
FIG. 3 is a view in vertical section of the eccentric ring members and bearings taken substantially along the line 3—3 of FIG. 2.

FIG. 3 illustrates the actual physical structure of the inner bearing member 66, outer bearing member 62, inner eccentric ring member 50 and outer eccentric ring member 52. Each of these members is generally cylindrically shaped with the bearing members having suitable ball bearings, such as ball bearing 51 and bearing races such as races 53 and 55. The bearings are conventionally clamped in position between shoulders and threadedly engaged and locked nut members 110, 112 and 114.

The outer bearing member 62 and both eccentric ring members 50 and 52 are formed with annular flanges at their upper end which are provided with a series of radially aligned threaded bores, such as threaded bore 116, spaced every 15° about their periphery. The threaded bores about the eccentric ring members permit the selective attachment of the tabs 106 and 108 at desired positions. The threaded bores about the outer bearing member 62 permit the selected attachment of the arm 80 forming a part of the stop means.

The outer bearing member 62 is press fit into an opening 120 in the support base 10. A support platform 122 is attached to the top of the inner bearing member 66 and is in the shape of a pie-shaped segment. The tool chuck 26, not shown in FIG. 3, and its associated mechanisms are carried on this platform 122.

Figure 4:
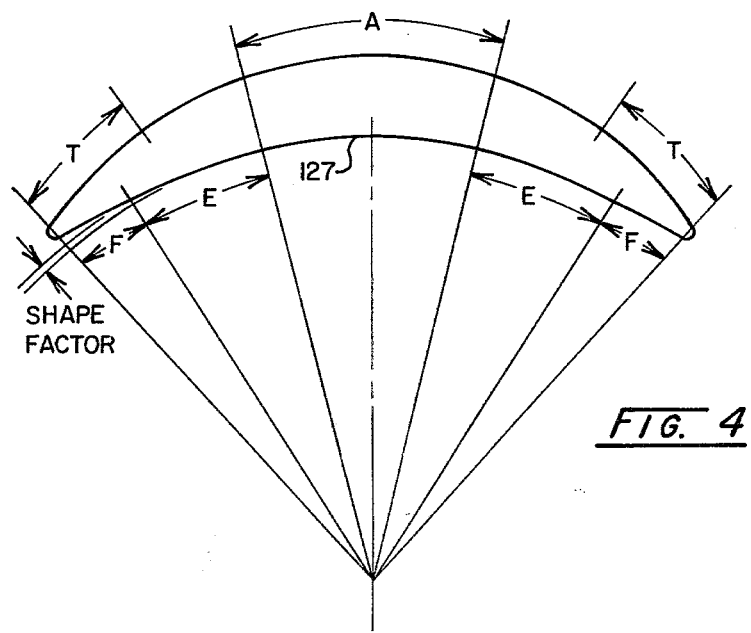
FIG. 4 is a diagram illustrating the shape factor of a contact lense.

FIG. 4 illustrates in simplified form the principles for shaping an opthalmic contact lense. The inner surface of the contact lense will include a base curve 127 which represents a spherical surface within the arc A. Outside the arc A and within the arc E is the intermediate curvature of the lense which departs from an extension of the spherical curvature of the base curve within the arc A. The distance between an extension of the spherical surface in arc A and the actual surface at the outer edge of the arc E is the shape factor and typically varies from 0.10 to 0.50 millimeters with an average value of 0.25 millimeters. Ouside the intermediate curve of arc E is the peripheral curve within the arc F.

The convex surface of the lense may also be similarly aspherical and may be provided with a trim radius within the arc T.

Figure 7:
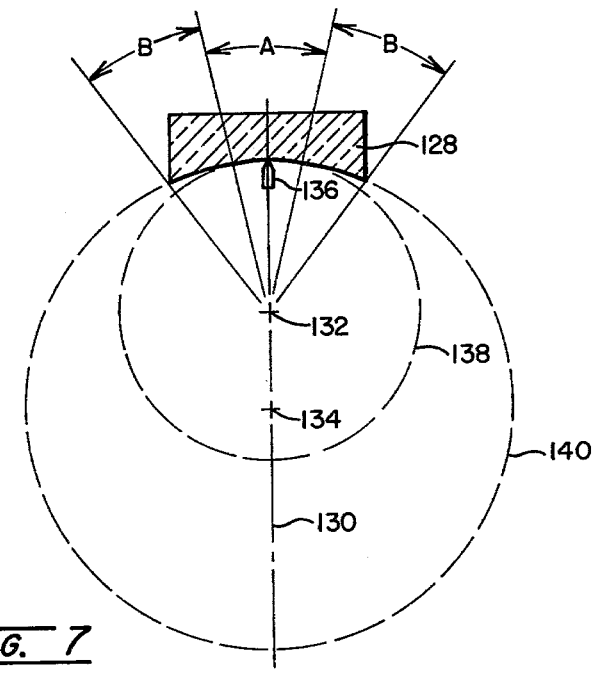
FIG. 7 through FIG. 11 are diagrams illustrating the operation and the tool motion of a lathe and tool carriage constructed in accordance with the present invention.
Figure 8:
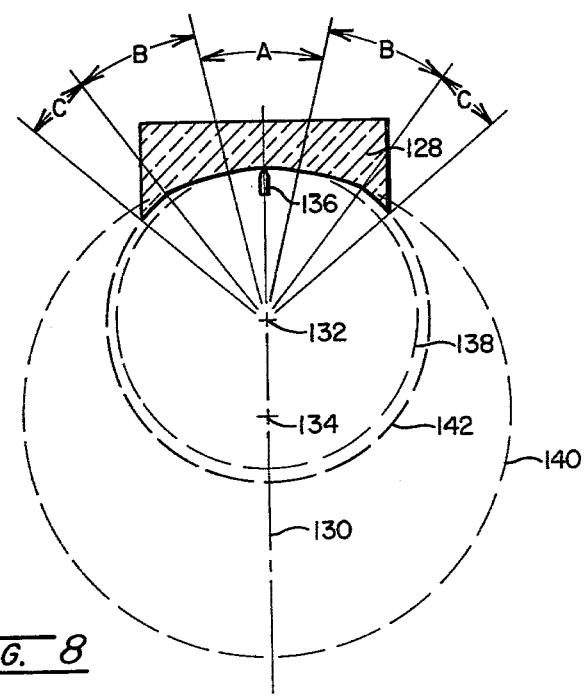
Figure 9:
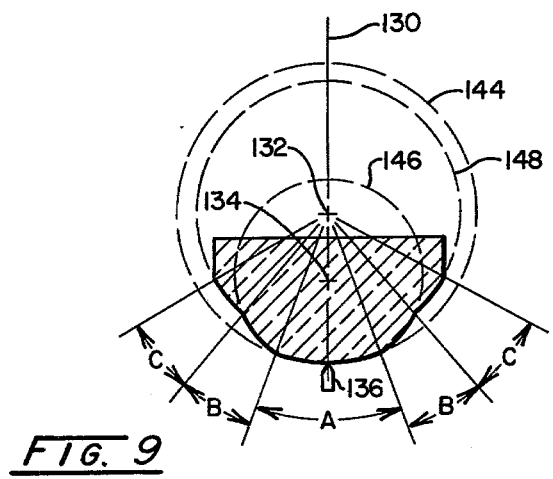

FIGS. 7–9 illustrate the operation of the preferred embodiment of the invention in shaping lens surfaces on a work piece 128. In these figures, as well as in FIGS. 10–14, eccentricities are greatly exaggerated in order to illustrate the operation of the invention.

Referring in particular to FIG. 7, the work piece 128 is rotated on the spindle about its axis of rotation 130. The center 132 is the primary center of the tool and is the center of the bearings formed on the inner bearing member and on the outer bearing member when the eccentric ring members are oppositedly positioned in their zero reference angular alignment. The center 134 is the center of the interfacing bearings between the two eccentric ring members when the ring members are positioned in the zero reference angular alignment. Therefore, in the embodiment illustrated in FIGS. 7–9, the primary center 132 is closer to the work piece 128 than the secondary center 134.

While all cutting is ordinarily done from the ouside of the work piece toward the center line, for purposes of initial discussion it is assumed that cutting is done from the center line. This is easier to understand and it will be seen that cutting from the outside toward the center is merely the opposite sequence of events.

Referring to FIGS. 5 and 7, if the catch means formed by fingers 102 and 104 and tabs 106 and 108 are suitably adjusted, the tool 136 may be swung through an arc of ½ A° to cut a spherical surface within the arc A about the primary center 132.

If the adjustable finger 104 and its associated tab 108 are properly adjusted so that they engage after the tool swings through an arc of ½ A°, the inner bearing member 66 and the inner eccentric ring member 50 will thereafter begin to move simultaneously. While moving in that state, the tool continues but is rotated about a vertical axis at center 134, which is the center of the interfacing bearings between the two eccentric ring members. Thus, in FIG. 7 the circle 138 represents the base curve in the interval A and its continuation or extension and is about the center 132. The circle 140 represents the intermediate curve in arcuate intervals B and its extension and is about the center 134. Therefore, in the interval A the lense shaped surface is a spherical surface on the circle 138. In the intervals B, as the tool 136 swings through an angle of B°, the lense surface will be formed on a portion of the circle 140.

Referring now to FIG. 8, if the adjustable finger 102 and its associated tab 106 are adjusted to engage after the tool swings through the arc B, then the inner bearing member 66 and both eccentric ring members 50 and 52 will thereafter all move simultaneously. During this simultaneous movement of all three components as the tool travels through an arc C, the tool will form a spherical surface which lies on a circle 142 about the primary center 132. Consequently, the composite surface illustrated in FIG. 8 is an aspherical surface having a base curve within the arc A, an intermediate curve within the arc B which extends smoothly radially outwardly from an extension of the base curve and then a peripheral curve which is concentric with the base curve.

While FIGS. 7 and 8 illustrate the formation of a concave lense shaped surface, FIG. 9 illustrates the forming of a convex lense shaped surface with the identical embodiment of the invention.

In FIG. 9 the tool has been backed off so that it is positioned on the opposite side of the primary center 132 than the position used in FIGS. 7 and 8. An initial pivotal movement of the inner bearing member 66 about the center 132 through an angle of ½ A° will cause the tool 136 to travel through an arc of ½ A° to form a spherical surface on a portion of the circle 144.

With suitable adjustment, the engagement of the finger 104 with the tab 108 will then cause the tool 136 to continue its pivotal motion but now about a vertical axis through the center 134. As the tool swings through an arc of B°, a spherical surface will be formed which lies on a portion of a circle 146. Subsequent engagement of the finger 102 and the tab 106 at the beginning of arcuate interval C causes the tool to move along a circle 148 about the primary center 132.

A shape factor can be determined for any convenient point on the lense surface and is the distance from the lense surface to an extension of the surface formed during interval A. During pivotal movement of the tool about the secondary center 134, the tool moves in a radial direction away from the extension of the circle of the base curve formed in the interval A. However, when rotation is about the primary center 132 the tool moves in a path concentric with the central base curve, as for example, in interval C. Therefore, the shape factor continuously increases during the interval B and does not change during the interval C.

Consequently, the finger 104 and tab 108 may be positioned to engage at the angle which defines the outer periphery of the base curve A. The finger 102 and the tab 106 are positioned to give the desired shape factor.

Therefore, in setting up to cut a desired lense shaped surface, the tool 136 first may be positioned a radial distance from the primary center 132 to give a base curve of the desired radius.

The tool may then be pivoted through the selected angle to the terminus of the base curve using the angle scale 38 shown in FIGS. 1 and 2. Tab 108 and finger 104 are then adjusted to engage at that angle. The tool is then swung through a further arc until the desired shape factor is attained as measured by gauge 51. At that angle, which will be a ½ A°+B°, the finger 102 and tab 106 are set to engage. The tool may thereafter be rotated further without additional change in the shape factor.

Figure 10:
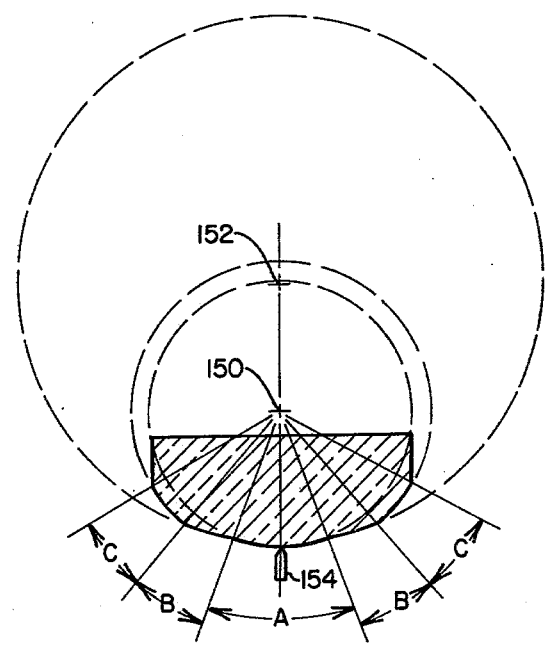
Figure 11:
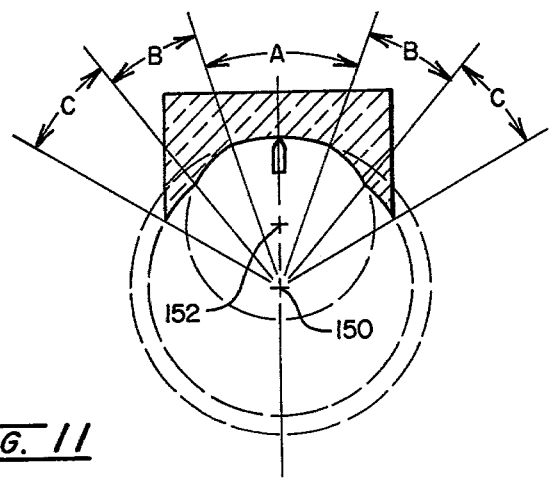

If the arm 80 of the stop means is positioned diametrically opposite from the position illustration in FIG. 5 and if the eccentric ring members 50 and 52 are rotated 180°, then the secondary center will be located nearer to the headstock than the primary center. This is illustrated in FIGS. 10 and 11 with the primary center 150 farther from the headstock than the secondary center 152. With this orientation illustrated in FIGS. 10 and 11, the cutting tool 154 will follow paths similar to that described in connection with FIGS. 7–9 except that during the interval B when the tool pivots about a vertical axis through the secondary center 152, the tool will move radially away from an extension of the base curve in a path that moves away from the headstock rather than toward the headstock as was illustrated in FIGS. 7–9.

Consequently, in FIG. 11 on a concave aspherical surface a negative shape factor is obtained while in FIG. 8 on a concave surface, a positive shape factor is attained. Similarly, in FIG. 10 the shape factor is opposite on a convex surface as it was in FIG. 9 on a convex surface.

As described above, the arm 80 of the stop means may be positioned at various angles about the outer bearing member 62. This will allow the axis of the zero reference angular alignment of the two eccentric ring members to be positionable at an oblique angle with the axis of the rotating spindle which carries the work piece. The effect of rotating the zero reference angular alignment is to rotate the position of the secondary center.

Figure 12:
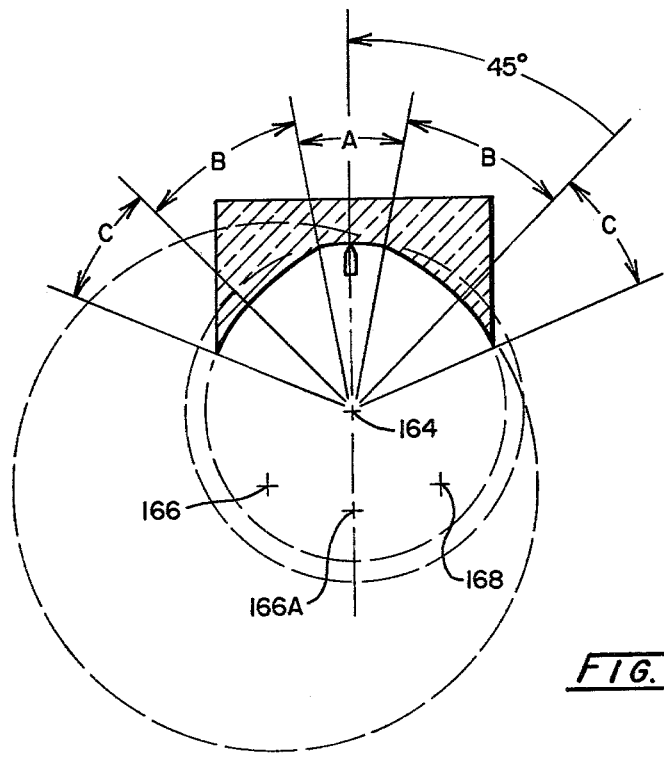
FIGS. 12 and 13 are diagrams illustrating the operation of an alternative embodiment of the invention having an adjustable stop means to permit adjustment of the zero reference angular alignment of the eccentric ring members.
Figure 13:
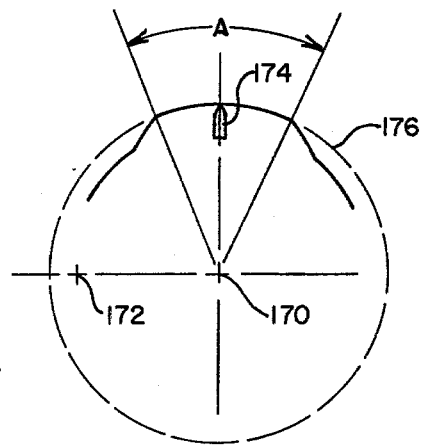

Thus, for example, referring to FIG. 12, if the axis of the zero reference angular alignment is shifted through 45° by moving the stop means 45° from the position illustrated in FIG. 2 or FIG. 5, the axis 160 of the zero reference angular alignment will be at a 45° angle with respect to the axis 162 of the spindle. In this adjusted position, the primary center 164 and the secondary center 166 are as illustrated in FIG. 12.

Figure 14:
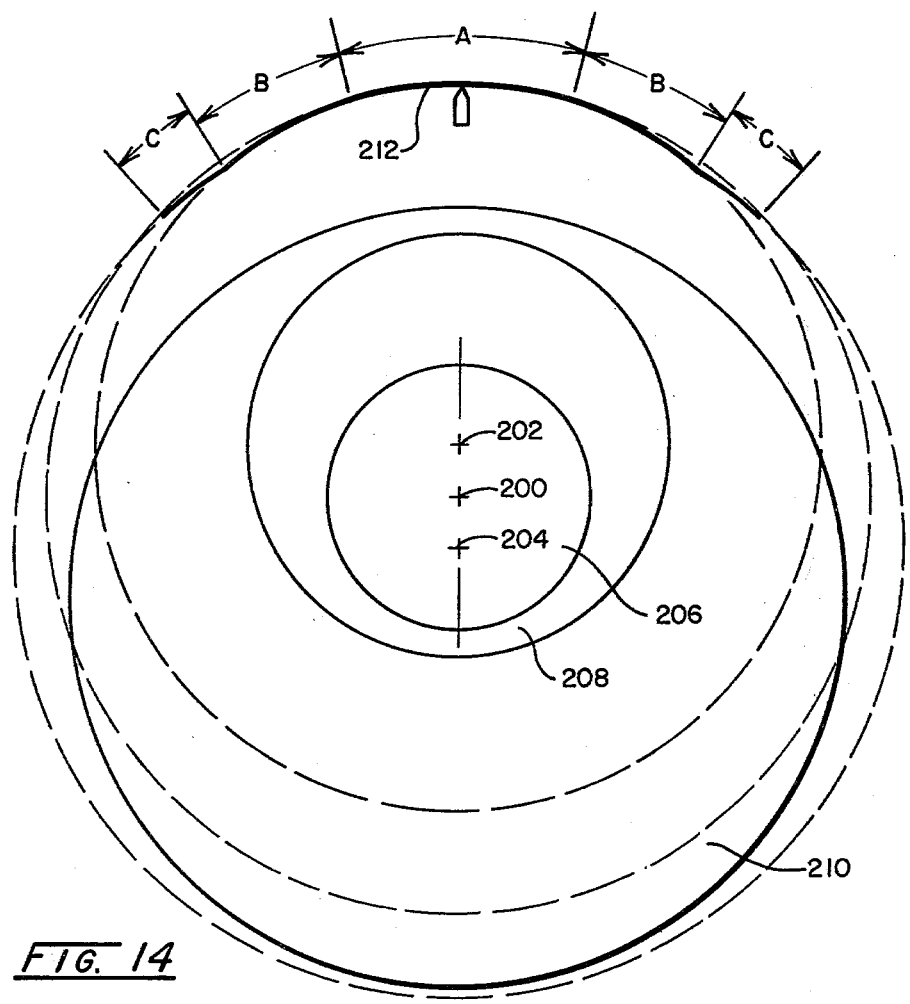
FIG. 14 is a diagrammatic view illustrating an alternative embodiment of the invention having eccentric members derived from three centers.

The center 168, which is illustrated in FIG. 12, is the mirror image of the center 166 and is used only for constructing FIG. 14. This mirror image is needed for construction on paper. However, it is not needed in operation of the tool because the lense shaped surfaces are cut on both sides of the axis 162 of the spindle when the tool is swung only on one side due to the rapid rotation of the workpiece.

The effect of pivoting the axis of the zero reference angular alignment is to reposition the secondary center at various angular positions about the primary axis. This will vary the rate at which the tool departs from an extension of the circle which defines the base curve within interval A. Thus, for example, in FIG. 12 as the secondary center 166 is moved from its original position 166A, it can be seen from well known geometrical principles that the arc cut in interval B will move inward. Thus, for example, one lense surface is shown in FIG. 14 while in FIG. 15 a lense surface is diagramatically constructed with the zero reference angular alignment shifted by 90°. This 90° shift of the stop means gives a primary center 170 and a secondary center 172 to provide a very rapid inward movement of the tool 174 from the extension 176 of the base curve in the interval A.

Therefore, the adjustment of the stop means allows the selection of a broader range of shape factors. It further permits the adjustment of the device so that for many shape factors the outer periphery of the lense will be at the termination of interval B making cutting in an interval C unnecessary.

FIG. 14 illustrates an alternative embodiment of the invention. The previously described embodiments use two eccentric ring members which are constructed from two centers, a primary center and a secondary center. The embodiment of the invention illustrated in 16 is constructed from three centers and has a primary center 200, a secondary center 202 and a tertiary center 204.

This structure is like that illustrated in the other figures except for that modification. It has an inner bearing member 206, an inner eccentric ring member 208 and an outer eccentric ring member 210 which seats rotatably within an outer bearing member which is not illustrated in the diagram of FIG. 14.

The interfacing bearings between the inner bearing member 206 and the inner eccentric ring member 208 are constructed about the center 200.

The interfacing bearings between the inner eccentric ring member 208 and the outer eccentric ring member 210 are circularly formed about the center 202 when the eccentric ring members are aligned at their zero reference angular alignment. Therefore, the eccentricity of the bearings of the inner eccentric ring member 208 is equal to the distance from the center 200 to the center 202.

However, the eccentricity of the bearing surfaces of the outer ring member 210 is greater than the eccentricity of the bearing surfaces of the inner ring member 208. The outer bearing of the outer eccentric ring member 210 is constructed about the center 204 when the eccentric ring members are aligned at their zero reference angular alignment.

FIG. 14 shows a lense surface 212 which has angular intervals A and B formed as described in connection with FIGS. 1-13. Therefore, the spherical surfaces within intervals A and B are formed with tool rotation about the centers 200 and 202 respectively.

However, interval C is formed by simultaneous rotation of the inner bearing member 206 and both eccentric ring members 208 and 210 so that tool rotation is about the center 204. The result is that the surface formed within interval C extends radially back toward an extension of the surface formed during interval A.

Therefore, simultaneous pivotal movement of the tool with pivotal movement of the inner eccentric ring member 208 continuously increases the shape factor. The simutaneous pivotal movement of the tool with both eccentric ring members decreases the shape factor.

As stated above, the cutting tool in an actual cutting operation moves from the outer periphery of the work piece toward the center. The movement of the tool is the same as described above but occurs in reverse sequence with interval C being cut first followed by B and then A. To accomplish this, and referring to FIG. 15, a biasing means such as a tension spring 300 is attached between the support base 10 and a crank arm 302 fixed to the inner bearing member 304.

These mechanisms are located within the support base 10. To cut the lense blank, the handle 32, shown in FIGS. 1 and 2, may be grasped and the tool rotated to beyond the periphery of the work piece. When the handle is released, the biasing means 300 returns the tool to the central position in alignment with the axis of rotation of the workpiece.

However, it is desirable to control the rate of angular rotation of the tool as it returns to a position along the axis of the spindle. This angular velocity may be greater at the peripheral area of the workpiece than it is near the center of the workpiece because the peripheral speed of the workpiece surface past the tool is greater near the periphery than near the center of the workpiece. Therefore, it is desirable to have a return which begins at an initially faster angular rate and slows down as the tool approaches alignment with the spindle.

The means for resisting the pivotal movement and for controlling the angular rate of the pivotal movement comprises a hydraulic cylinder 306 containing a hydraulic piston. One end of the cylinder is pivotally connected by pivot pin 308 to the inner bearing member 304 radially outwardly from the center 314 of the inner bearing member 304.

The other end of the hydraulic cylinder 306 is pivotally connected through pivot pin 310 to the support base 10. However, the hydraulic cylinder 306 is connected to the support base 10 through an adjustable linkage so that its lateral position may be adjusted. This lateral adjustment controls the variation in the rate of angular return of the tool member as a function of its angular position.

More particularly, the pivot pin 310 is adjustable so as to be able to adjust the angle between the longitudinal axis of the cylinder 306 and the radius which extends from the center 314 of the inner bearing member 304 through the pivot pin 308. The pivot pin 310 must be positioned so that this angle between the axis of the cylinder 306 and the radius through the pivot pin 308 become closer to 90° as the chuck is pivoted toward alignment with the spindle.

The hydraulic cylinder contains hydraulic fluid and is connected to a fluid reservoir 316 through a controlled valve 318, a parallel check valve 317 and a return line 319. It is this valve which is controlled by the adjustment knob 31 illustrated in FIG. 1. The arm 27 illustrated in FIG. 1 controls the positioning of the pivot pin 310.

FIG. 1 shows the pivot pin 310 formed on a tee nut 350. The end of the pivot pin 310 is threadly engaged to a nut 352 to secure the end of the hydraulic cylinder 306. The end 354 of the arm 27 is threaded to a threaded rod 356 which extends through a lateral slot 358 formed in the base plate 360 and into threaded engagement with the tee nut 350. Pivoting of the arm 27 loosens the tee nut 350 and permits the whole assembly to slide laterally to a desired position. Opposite pivoting of the arm 27 clamps the tee nut 350 in a selected position.

Figure 15:
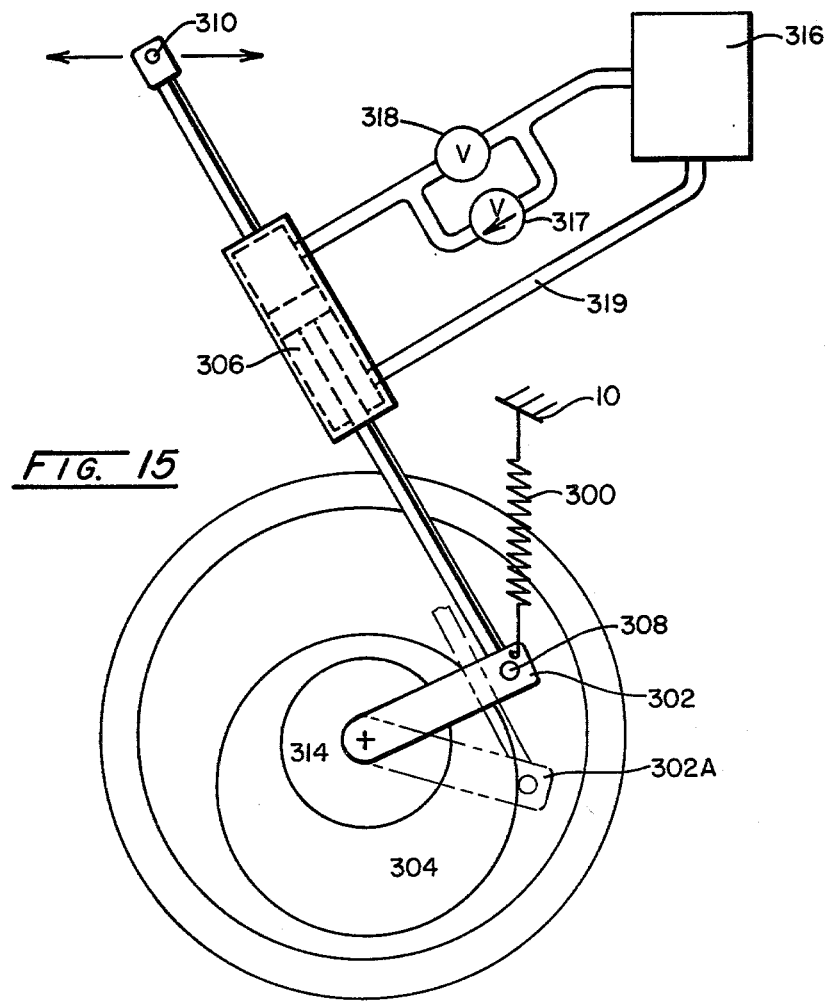
FIG. 15 is a diagrammatic view illustrating a means for controlling the angular rate of the pivotal movement of a cutting tool during a cutting operation and which is a part of the preferred embodiment of the invention illustrated in FIG. 1.

The operation of the device in FIG. 15 may begin with the pivoting of the inner bearing member 304 to rotate the crank arm 302 to the position 302A illustrated in phantom. This will draw hydraulic fluid into the hydraulic cylinder. When the handle 32, illustrated in FIG. 1, is released, the spring biasing means 300 will begin to pivot the inner bearing member 304 and return the crank arm 308 towards its original position.

The rate of linear translation of the hydraulic cylinder will be determined by the size of the orifice and the valve 318. However, the angular rate of return of the crank arm 302 and therefore of the inner bearing member 304 will be a trigonometric function based on the angle between the crank arm 302 and the axis of the hydraulic cylinder 306.

As the direction of motion of the pivot pin 308 comes closer to the axis of the hydraulic cylinder 306, the angular velocity of the inner bearing member 304 will become less.

Figure 16:
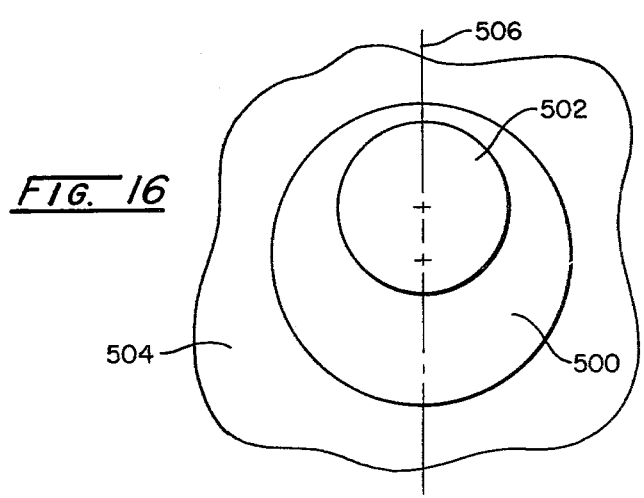
FIG. 16 is a diagrammatic view of an alternative embodiment of the invention having only one eccentric ring member.

FIG. 16 illustrates an alternative embodiment of the invention which can operate with the advantages of the invention but not as effectively as the preferred embodiment.

The embodiment of FIG. 16 has a single eccentric ring member 500 with a mating inner bearing member 502 and a mating outer bearing member 504.

Operation is the same as the operation of the preferred embodiment of FIG. 1 except that there is only one eccentric ring member to be picked up by its catch means at a selected angle and be moved simultaneously with the inner bearing member.

The embodiment of FIG. 16 not only has a catch means but also has a stop means as described above which is adjustably positionable for selecting the position of the zero reference angular alignment at some angle to the spindle axis 506. Selection of the zero reference angular alignment is for selection of the shape factor.

However, such adjustment of the zero reference angular alignment will, with only one eccentric ring member, shift the tool laterally off the spindle centerline 506. This, however, may be compensated for bi-lateral adjustment of the slideable table 17 on which the spindle is supported.

Referring to FIG. 1, the gauge 51 is used to measure the shape factor, that is the distance that the tool moves away from a continuation of the central or base curve in interval A. To measure the shape factor the gauge 51 is mounted to the inner bearing member on a radius which is parallel to a radius through the tool.

The gauge moves with the tool and its feeler arm engages a cylindrical surface 53 which is mounted to the base 10 and is concentric with the base curve in interval A.

The gauge is zeroed and any departure of the tool from the base curve in interval A will be measured by the gauge 51.

FIG. 17 illustrates the improved polishing tool of the present invention. The polishing tool uses a lathe-type device having a support base and including a rotatably driven spindle 404. The spindle supports a workpiece 406.

The lathe also has a tool carriage mounted to the support base which includes a tool chuck 408 for supporting a tool such as the polishing tool 410. The tool chuck is pivotable about a vertical axis or an axis which is perpendicular to the axis of rotation of the spindle and is adjustably translatable along its axis for positioning the tool a selected radial distance on either side of the pivot axis. Additionally there is provided means, such as an electric motor 412, for rotatably driving the tool chuck 408 through a drive belt 414.

Two embodiments of the polishing tool are illustrated in FIGS. 18 and 19. Referring to FIG. 18, the polishing tool for polishing concave lenses comprises a support body 416 which is coaxially attached to the tool chuck 408. A flexible polishing membrane 418 in FIG. 18 and 419 in FIG. 19 is coaxially mounted to the support body 416 at the periphery of the membrane. Preferably, it is attached by means of a ring 420 which is interference fit to clamp the membrane 418 or 419 between itself and the support body 416.

A biasing means is mounted to the support body and seats against the membrane for supporting the membrane in a selected contour. In FIG. 18 the biasing means is a resiliently biased coaxial rod 422 biased by a spring 424 to seat against the center of the membrane 418 to hold its outer surface in a convex contour.

In FIG. 19 the biasing means is a resiliently biased coaxial annulus 426 biased by a spring 428 to seat against the membrane to permit the workpiece to deform the outer surface of the membrane into a concave contour illustrated at 430.

Industrial Applicability

The invention provides a tool carriage for a lathe which will provide for the improved and simplified cutting of contact lenses and other concave or convex aspherical surfaces on other types of workpieces.

A lathe tool carriage with the invention will cut an aspherical surface or lenticular surface to pre-determined dimensions utilizing entirely pivotal motion of the tool and carraige parts thereby greatly improving the accuracy of the formed surface. The surfaces are aspherical and yet are smoothly and continuously contoured to within close tolerances.

I claim:
1. In a lathe for forming a lense shaped surface on a workpiece, said lathe being of the type having a support base, a headstock mounted to said support base and including a rotatably driven spindle for supporting a workpiece and a tool carriage mounted to said support base including a tool chuck supporting a tool, said chuck being pivotable about a pivot axis which is perpendicular to the axis of said spindle and adjustably translatable along its axis for positioning the tool a selected radial distance on either side of said pivot axis, an improved tool carriage comprising:
    (a) a support frame mounted to said support base;
    (b) an eccentric ring member having an inner and an outer circular bearing which are eccentric to each other;
    (c) an outer bearing member mounted to said support frame and having a circular, inside bearing for rotatably mating with the outer bearing of said eccentric ring member;
    (d) an inner bearing member supporting said tool chuck and having a circular, outside bearing which is concentric with said pivot axis for rotatably mat- ing with the inner bearing of said eccentric ring member;

(e) cooperating catch means attached to said inner bearing member and said eccentric ring member for being selectively positioned to engage at a selected angle of rotation for effecting the rotation of said eccentric ring member simultaneously with the rotation of said inner bearing member and said tool subsequent to said engagement; and (f) a stop means adjustably attached to said outer bearing member and said eccentric ring member for preventing pivotal movement of said eccentric ring member in one direction beyond zero reference angular alignment, said stop means being adjustable to selected angular positions about the center of said bearing of said outer bearing member to adjustably select the position of said zero reference angular alignment.

2. A tool carriage in accordance with claim 1 wherein said eccentric ring member is biased toward said stop means.

3. In a lathe for forming a lense-shaped surface on a workpiece, said lathe being of the type having a support base, a headstock mounted to said support base and including a rotatably driven spindle for supporting a workpiece and a tool carriage mounted to said support base including a tool chuck supporting a tool, said chuck being pivotable about a pivot axis which is perpendicular to the axis of said spindle and adjustably translatable along its axis for positioning the tool a selected radial distance on either side of said pivot axis, an improved tool carriage comprising:

(a) at least two relatively rotatable, interfitting, eccentric ring members, each eccentric ring member having an inner and an outer circular bearing which are eccentric to each other, the interfacing bearings of adjacent ones of said eccentric ring members rotatably mating with each other;

(b) an outer bearing member mounted to said support base and having a circular, inside bearing for rotatably mating with the outer bearing of the outermost one of said eccentric ring members;

(c) an inner bearing member supporting said tool chuck and having a circular, outside bearing which is concentric with said pivot axis for rotatably mating with the inner bearing of the innermost one of said eccentric ring members; and (d) cooperating catch means attached to said inner bearing member and said eccentric ring member for being selectively positioned to engage at a selected angle of rotation for effecting the rotation of at least one of said eccentric ring members simultaneously with the rotation of said inner bearing member and said tool subsequent to said engagement.

4. A tool carriage in accordance with claim 3 wherein there are two of said eccentric ring members which are oppositely positionalbe in a zero reference angular alignment in which the inside bearing of said outer bearing member and the outside bearing of said inner bearing member are concentric.

5. A tool carriage in accordance with claim 4 wherein the least radial distance between the bearings of both of said eccentric ring members are equal.

6. A tool carriage in accordance with claim 5 wherein said catch means are provided for engaging both of said eccentric ring members at independently selectable angles and wherein said catch means are adjustable for adjustably selecting their angle of engagement.

7. A tool carriage in accordance with claim 4 wherein a stop means is attached to said outer bearing member and said eccentric ring members for preventing pivotal movement of said ring members in one direction beyond said zero reference angular alignment.

8. A tool carriage in accordance with claim 7 wherein said eccentric ring members are biased toward said stop means.

9. A tool carriage in accordance with claim 8 wherein the portion of said stop means which is attached to said outer bearing member is adjustable to selected angular positions about the center of said bearing of said outer bearing member.

10. A tool carriage in accordance with claim 3 wherein there are two of said eccentric ring members which are oppositely positionable in a zero reference angular alignment wherein the eccentricity of the bearings of the outer eccentric ring is greater than the eccentricity of the bearings of the inner eccentric ring member.

11. A tool carriage in accordance with claim 3 wherein a stop means is attached to said outer bearing member and said eccentric ring members for preventing pivotal movement of said ring members in one direction beyond said zero reference angular alignment.

12. A tool carriage in accordance with claim 11 wherein said tool carriage is provided with biasing means biasing said inner bearing member in pivotal movement to urge said tool chuck toward alignment with said spindle and means for resisting said pivotal movement for controlling the angular rate of said pivotal movement, said resisting means comprising a hydraulic cylinder and piston having one end pivotally connected to said inner bearing member radially outwardly from its center and having the other end pivotally connected to said support base, said cylinder being aligned so that the angle between its longitudinal axis and the radius of said inner bearing member which extends through the pivotal connection of said cylinder to said inner bearing member becomes closer to 90° as said chuck is pivoted toward alignment with said spindle, said hydraulic cylinder containing hydraulic fluid being in fluid connection to a reservoir through a controlled valve.

13. A tool carriage in accordance with claim 12 wherein the pivotal connection of said cylinder to said support base is adjustably moveable transversely of said cylinder for adjusting the angular rate of pivotal movement of said tool chuck.

\* \* \* \* \*